(12) United States Patent
Kozarekar

(10) Patent No.: US 6,362,602 B1
(45) Date of Patent: Mar. 26, 2002

(54) STRATEGY TO CONTROL BATTERY STATE OF CHARGE BASED ON VEHICLE VELOCITY

(75) Inventor: Shailesh S. Kozarekar, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/848,395

(22) Filed: May 3, 2001

(51) Int. Cl.[7] .............................. H02J 7/00; H02J 7/14
(52) U.S. Cl. ...................................................... 320/160
(58) Field of Search ............................... 320/160, 162, 320/132

(56) References Cited

U.S. PATENT DOCUMENTS

| | | |
|---|---|---|
| 4,187,436 A | 2/1980 | Etienne |
| 4,313,080 A | 1/1982 | Park |
| 4,682,097 A | 7/1987 | Matsui |
| 5,115,183 A | 5/1992 | Kyoukane et al. |
| 5,264,764 A | 11/1993 | Kuang |
| 5,343,970 A | 9/1994 | Severinsky |
| 5,550,445 A | 8/1996 | Nii |
| 5,945,808 A | 8/1999 | Kikuchi et al. |
| 5,969,624 A | 10/1999 | Sakai et al. |
| 6,091,228 A | 7/2000 | Chady et al. |
| 2001/0024104 A1 * | 9/2001 | Suzuki ....................... 320/104 |

* cited by examiner

Primary Examiner—Gregory Toatley
(74) Attorney, Agent, or Firm—Karl Vick, Esq.

(57) ABSTRACT

The present invention is to provide an improved strategy for actively controlling battery state of charge (SOC) as a function of the vehicle's kinetic energy. A vehicle system controller (VSC) can vary a target battery SOC as a function of vehicle speed based on either vehicle kinetic energy or the square of vehicle speed. The VSC can set a maximum battery SOC limit using vehicle velocity and actively control a rate of charging the battery and determine a target battery SOC as a balance between the charge time and the charge current. The VSC can determine a target battery SOC based on a predetermined constant and a predetermined offset value. Target battery SOC is increased as vehicle speed increases until the maximum battery SOC limit is reached.

10 Claims, 2 Drawing Sheets

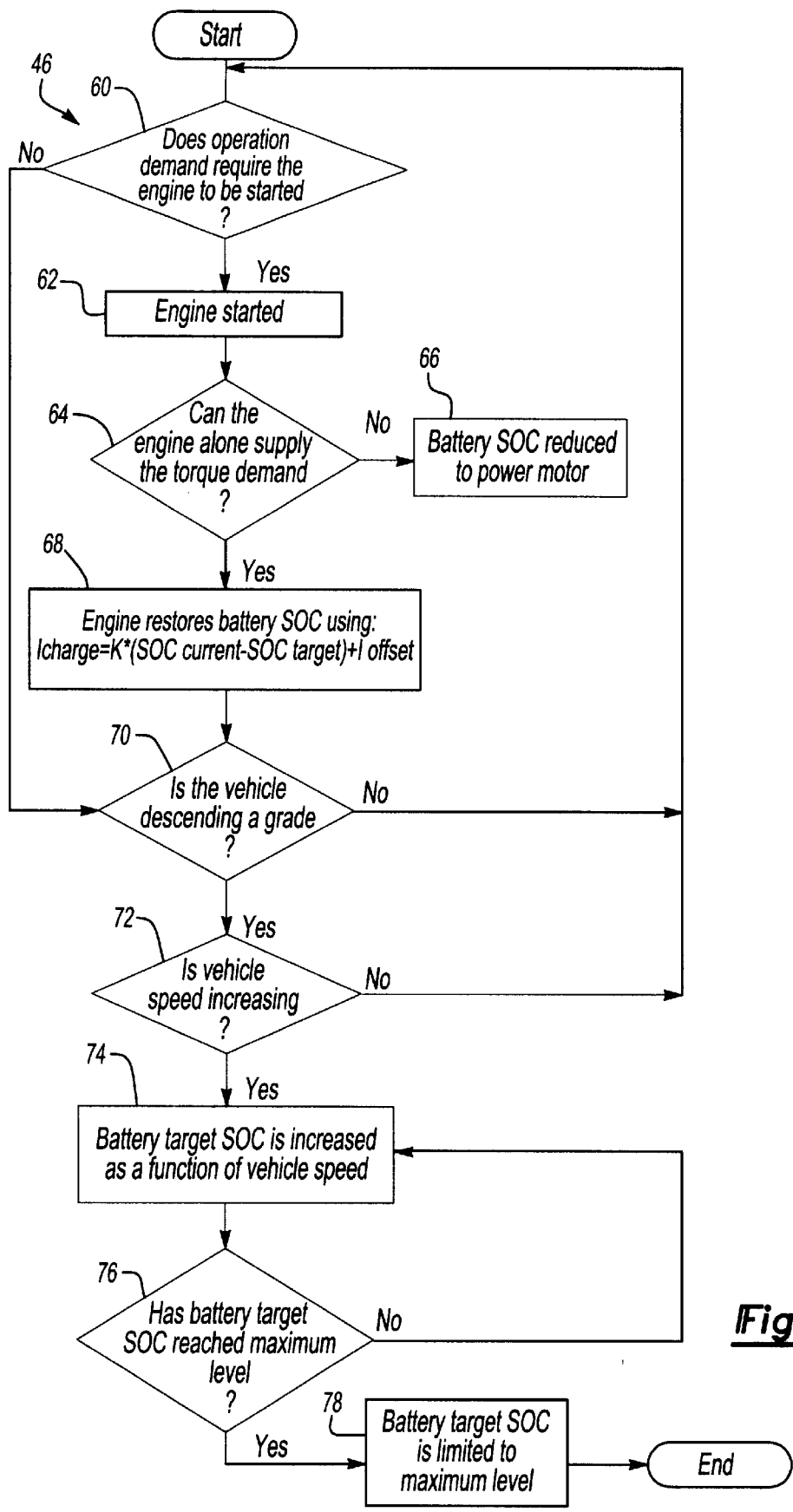

STRATEGY TO CONTROL BATTERY STATE OF CHARGE BASED ON VEHICLE VELOCITY

BACKGROUND OF THE INVENTION

1. Field of the Invention

The present invention relates generally to a strategy to control battery state of charge (SOC) and specifically to control the battery SOC based on vehicle velocity.

2. Discussion of the Prior Art

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The desirability of combining an ICE with electric motors is clear. There is great potential for reducing vehicle fuel consumption and emissions with no appreciable loss of vehicle performance or drive-ability. The HEV allows the use of smaller engines, regenerative braking, electric boost, and even operating the vehicle with the engine shutdown. Nevertheless, new ways must be developed to optimize the HEV's potential benefits, An HEV can use batteries to store electrical energy for use by the vehicle's electric motor. Active control of the HEV battery becomes a critical vehicle function to achieve the HEV goals of reduced emissions and fuel economy. Such active battery control cannot only increase overall vehicle performance and fuel economy but also increase battery life.

Simple passive battery controllers are known in the prior art that respond only to battery voltage. The simplest controllers fail to maintain the batteries at a controlled charge level. The batteries slowly discharge during operation. Further, a passive battery controller is inefficient because it cannot control the battery operating point.

Battery state of charge (SOC) controls for vehicles are known in the prior art using various conditions or criteria. See generally, U.S. Pat. No. 5,969,624 to Sakai et al. (battery cell voltage); U.S. Pat. No. 5,945,808 to Kikuchi et al. (battery temperature and the current SOC); U.S. Pat. No. 6,091,228 to Chady et al. (uses at least integration and produces a signal source representing the desired auxiliary source current); U.S. Pat. No. 4,187,486 to Etienne (excitation winding of the generator in accordance with the SOC); U.S. Pat. No. 5,264,764 to Kuang (power signal generated when the battery SOC is less than a predetermined intermediate value and the energy consumed by the electric drive system is greater than the electric energy delivered by the range extender); U.S. Pat. No. 5,115,183 to Kyoukane et al. (circuit to control engine speed and predetermined generator speed); U.S. Pat. No. 5,550,445 to Nii (detects various conditions for heavy loads); and U.S. Pat. No. 4,313,080 to Park (uses battery voltage).

Battery controllers using vehicle speed are also known in the prior art. U.S. Pat. No. 4,682,097 to Matsui describes battery charging as a function of the difference between vehicle speed and the charge top speed. In the invention, a "balance" vehicle speed, the speed at which mean charging current and mean discharging current are balanced, is obtained. Next a "charge stop" vehicle speed corresponding to the balance vehicle speed is calculated as a reference value. When the charge stop speed is greater than the actual vehicle speed, battery charging is stopped.

Many improvements and variations to prior art battery controls are possible. For example, Matsui only calibrates the charge stop speed as a linear function of the vehicle velocity. New ways to control battery SOC including both harging and discharging when appropriate need to be developed using an active control strategy. This type of application would be particularly useful in a hybrid electric vehicle.

SUMMARY OF THE INVENTION

Accordingly, an object of the present invention is to provide an improved strategy for actively controlling battery state of charge (SOC) as a function of the vehicle's kinetic energy.

The present invention provides a strategy for a vehicle system controller (VSC) to vary a target battery SOC as a function of vehicle speed based on either vehicle kinetic energy or the square of vehicle speed. The VSC can set a maximum battery SOC limit using vehicle velocity and actively control a rate of charging the battery and determine a target battery SOC as a balance between the charge time and the charge current.

As part of the strategy to actively control the battery SOC, the VSC can determine a target battery SOC based on a predetermined constant and a predetermined offset value. The strategy can increase target battery SOC as vehicle speed increases until the maximum battery SOC limit is reached.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which:

FIG. 2 illustrates a possible control strategy of the present invention.

DETAILED DESCRIPTION OF THE PREFERRED EMBODIMENT

Figure 1:
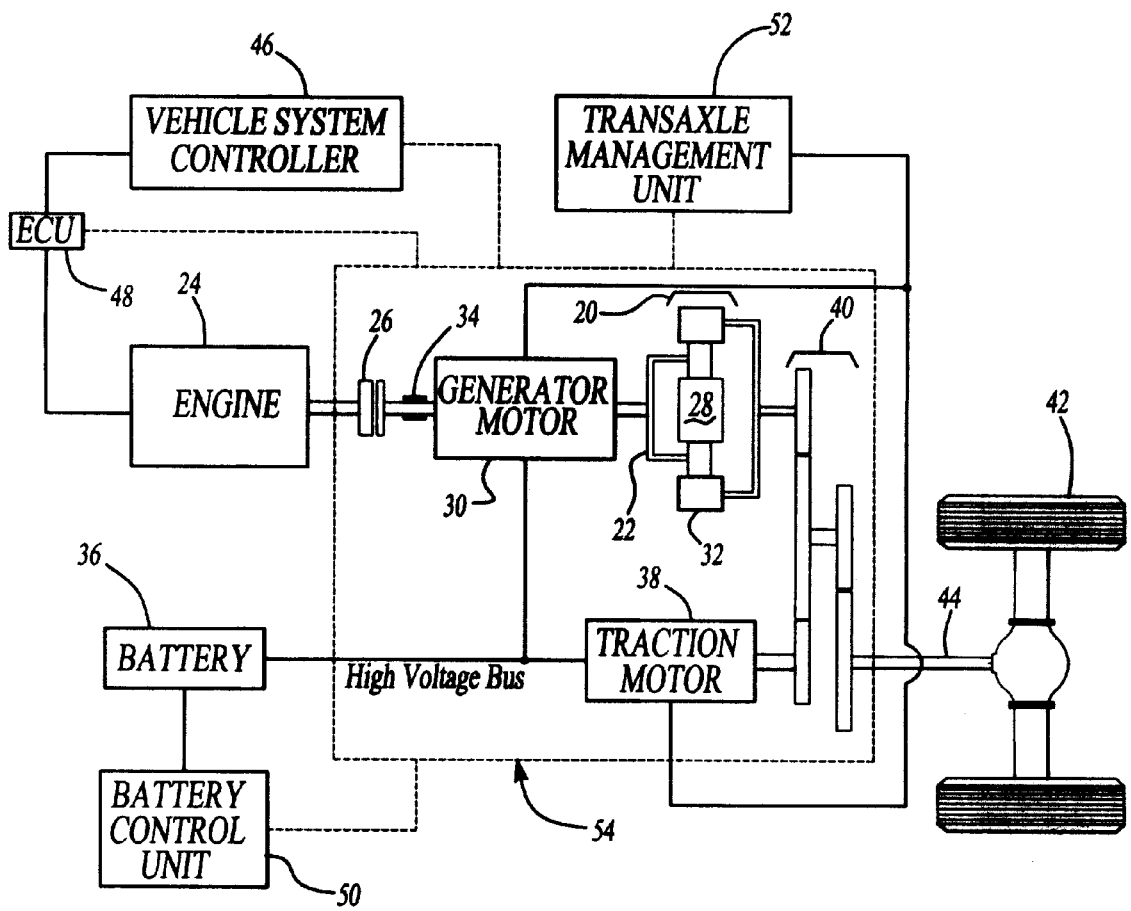
FIG. 1 illustrates a general hybrid electric vehicle (HEV) configuration.

The present invention relates to battery control systems. Although the preferred embodiment describes using the invention in a hybrid electric vehicle, the present invention could be applied to any vehicle using a battery and means to charge the battery.

To better understand the present invention, FIG. 1 illustrates a possible HEV configuration, specifically a parallel/series hybrid electric vehicle (powersplit) configuration. In this basic HEV configuration, a planetary gear set 20 mechanically couples a carrier gear 22 to an engine 24 via a one-way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the engine 24 via a hardwire interface. The ECU 48 and VSC 46 can be based in the same unit, but are actually separate controllers. The VSC 46 communicates with the ECU 48, as well as a battery control unit (BCU) 50 and a transaxle management unit (TMU) 52 through a communication network such as a controller area network (CAN) 54. The BCU 50 connects to the battery 36 via a hardwire interface. The TMU 52 controls the generator motor 30 and traction motor 38 via a hardwire interface.

With these HEV system controllers in place, the vehicle can optimize overall performance and efficiency. This can include not only various torque output combinations, but also regenerative braking. Regenerative braking (regen) captures kinetic energy of the vehicle as it decelerates. In conventional vehicles, kinetic energy is usually dissipated as heat at the vehicle's brakes or engine during deceleration. Regen converts the captured kinetic energy through the generator motor 30 into electrical energy in the form of a stored charge in the battery 36. This stored energy is used later to power the traction motor 38. Consequently, regen also reduces fuel usage and emission production. In certain vehicle configurations, the engine 24 can be shut down from the powertrain thereby allowing more of the kinetic energy to be converted into stored electrical energy, through the generator motor 30, as the one way clutch 26 provides the reaction torque.

In any HEV, battery 36 SOC is a critical parameter for fuel economy. Electrical power requirements differ at different speeds while the battery 36 SOC is maintained within a certain range. If the same SOC is maintained during a vehicle speed range, the vehicle kinetic energy cannot be recaptured through regenerative braking since it can generate an undesirable SOC, degrading battery life and performance. As a result, the energy is wasted. If battery 36 SOC is controlled as a function of the vehicle speed, it leaves enough capacity in the battery 36 to capture the kinetic energy of the vehicle because the kinetic energy increases in square relationship to vehicle speed.

The present invention is a VSC 46 strategy, based on maximum set limits using vehicle velocity, to vary battery 36 SOC as a function of vehicle kinetic energy or a square of vehicle speed. This allows better utilization of regenerative braking energy and overall vehicle operation. This is accomplished by limiting direct battery 36 charging from the engine 24 to the desired battery 36 SOC, described below.

The present invention controls battery 36 SOC within a narrow limit, which improves battery 36 life, as a function of the vehicle kinetic energy using the following equation:

$$soc_v = soc_{v=0} - rf \cdot m_{veh} \cdot v^2.$$

In the equation, $soc_v$ is the desired vehicle SOC at a given velocity, $soc_{v=0}$ is vehicle SOC when velocity is at zero, rf is the recovery factor, $m_{veh}$ is vehicle mass, and $v^2$ is the velocity squared from a vehicle velocity sensor (not shown). the recovery factor takes into account the efficiency of the energy recovery system and is the ratio of the energy captured in the battery 36 to the decrease in the kinetic energy of the vehicle.

The amount of battery 36 discharge during the engine 24 art-up can be determined by the various variables such as operator demand and vehicle coasting down a grade. These two conditions are illustrated in the VSC 46 strategy of FIG. 2. One skilled in the art could add many other types of variables.

At Step 60 the VSC 46 determines if the engine 24 needs to be started. If yes, the strategy starts the engine 24 at Step 62. Next, the strategy determines whether the engine 24 alone can supply sufficient power to meet operator torque demand at Step 64. If no, the battery 36 can be used to supply energy to spin the generator motor 30 at Step 66. Here the battery 36 SOC is reduced from the level at a vehicle speed of zero (0) to the vehicle speed when the engine 24 is started.

If the engine 24 alone can supply sufficient power to meet operator torque demand at Step 64, the engine 24 can restore the battery 36 SOC to a target SOC at Step 68, the instantaneous vehicle velocity using the following equation:

$$I_{charge} = K \cdot (soc_{current} - soc_{target}).$$

In the equation, $I_{charge}$ is the instantaneous rate of charge, K is a constant of vehicle kinetic energy (or gain), $soc_{current}$ is the current battery SOC, and $soc_{target}$ is the target SOC. One possible definition of the gain can be the percent of energy recovery through parallel regenerative braking. In parallel regenerative braking, the fixed percentage of the total vehicle energy is recovered in the battery. The rest goes to the foundation mechanical brakes. In the case of series regenerative braking (In series regenerative braking, vehicle energy is recovered fully in the battery. It is only when the generator motor or battery cannot accept the energy that the foundation mechanical brakes are used.), the gain can be as high as 1, when the vehicle kinetic energy is fully recovered. In a cycle of acceleration and deceleration, additional vehicle fuel economy of around ten percent can be achieved.

Because the equation above will never reach the desired SOC, a small current offset (hysteresis) is added to the current charge. When the current SOC is within acceptable tolerance range of the target SOC, the charge current is set to zero (0) using the following equation:

$$I_{charge} = K \cdot (soc_{current} - soc_{target}) + I_{offset}$$

If $soc_{current}$ equals $soc_{target} +/-$ a predetermined tolerance, $I_{charge}$ is set to zero (0).

Next, the strategy determines if the vehicle is descending a grade (e.g., cosating at Step 70 using vehicle sensors not shown. The strategy also skips from Step 60 to Step 70 if the strategy determines the engine 24 does not need to be started. In Step 70 if the strategy determines the vehicle is descending down a grade, the battery 36 target SOC can be increased at Step 74, but only if vehicle speed does not decrease during the vehicle descent as determined in Step 72. This again is achieved by adjusting the target SOC as a function of vehicle speed.

Next, the strategy at Step 76 determines if the increased target SOC of Step 74 has reached a predefined maximum level. If no, the strategy returns to Step 74. If yes, the battery 36 SOC target is limited at Step 78. This limited level is higher than the normal SOC as a function of vehicle speed as described above. One possibility is to set this level equal to target SOC at v=0. This limit is invoked only after the initial target SOC is reached and only vehicle regenerative energy is used to increase the SOC. Engine 24 braking can be added if the regenerative energy available is higher than the upper target.

The target battery 36 SOC is controlled actively to the desired state instead of selecting predetermined passive limits. The rate of charging the batter 36 is controlled to achieve the balance between the charge time and the charge current. Further, the engine 24 charging the battery 36 is controlled to effectively control the SOC variation.

The table below demonstrates an acceleration and deceleration cycle showing a fuel economy of around 30 percent using 50 percent regenerative braking under test conditions where acceleration from 0 to 50 miles per hour (mph) occurs in 30 seconds and braking to 0 in ten seconds.

| Driving Profile State-of-charge not a function of kinetic energy | | |
|---|---|---|
| Vehicle Weight | 1900 | Kg |
| Road Resistance | 0.08 | |
| Battery State-of-charge | 1 | Ahr |
| Air Drag Coefficient | 0.4 | |
| Frontal Area | 2 | M2 |
| Battery Voltage | 240 | V |
| Initial Velocity | 0 | km/hr |
| Acceleration Time | 30 | Sec |
| Steady Velocity | 80 | km/hr |
| Deceleration Time | 10 | Sec |
| Final Velocity | 0 | km/hr |
| Initial Velocity | 0 | m/s |
| Initial Kinetic Energy | 0 | KJ |
| Initial Potential Energy (SOC) | 864 | KJ |
| Initial Total Energy | 864 | KJ |
| Steady Velocity | 22.22 | m/s |
| Acceleration | 0.74 | m/s2 |
| Steady State Pot. En. (SOC) | 864 | KJ |
| Steady State Kinetic Energy | 469.14 | KJ |
| ACCELERATION PHASE | | |
| Distance Traveled during accln phase | 333.33 | M |
| Work done against friction | 496.53 | KJ |
| Work done against drag | 32.92 | KJ |
| Work Done by engine | 998.59 | KJ |
| Average Engine Power required during acceleration | 33.29 | KW |
| Fuel Consumption Rate | 250 | g/kWhr |
| Total Fuel Consumption | 69.35 | g |
| DECELERATION PHASE | | |
| Work done against friction | 165.51 | KJ |
| Work done against drag | 10.97 | KJ |
| Kinetic Energy decrease | 469.14 | KJ |
| Energy recovery at battery | 0.00 | KJ |
| Energy wasted at brakes | 314.60 | KJ |

| Driving Profile State of charge is a function of kinetic energy 50% regen) | | |
|---|---|---|
| Vehicle Weight | 1900 | kg |
| Road Resistance | 0.08 | |
| Battery State-of-charge | 1 | Ahr |
| Air Drag Coefficient | 0.4 | |
| Frontal Area | 2 | m2 |
| Battery Voltage | 240 | V |
| Initial Velocity | 0 | km/hr |
| Acceleration Time | 30 | sec |
| Steady Velocity | 80 | km/hr |
| Deceleration Time | 10 | sec |
| Final Velocity | 0 | km/hr |
| Initial Velocity | 0 | m/s |
| Initial Kinetic Energy | 0 | kJ |
| Initial Potential Energy (SOC) | 864 | kJ |
| Initial Total Energy | 864 | kJ |
| Steady Velocity | 22.22 | m/s |
| Acceleration | 0.74 | m/s2 |
| Steady State Pot. En. (SOC) | 629.43 | kJ |
| Steady State Kinetic Energy | 469.14 | kJ |
| ACCELERATION PHASE | | |
| Distance Traveled during accln phase | 333.33 | m |
| Work done against friction | 496.53 | kJ |
| Work done against drag | 32.92 | kJ |
| Work Done by engine | 764.02 | kJ |
| Average Engine Power required during acceieration | 25.47 | kW |
| Fuel Consumption Rate | 250 | g/kWhr |
| Total Fuel Consumption | 53.06 | g |
| DECELERATION PHASE | | |
| Work done against friction | 165.51 | kJ |
| Work done against drag | 10.97 | kJ |
| Kinetic Energy decrease | 469.14 | kJ |
| Energy recovery at battery | 234.57 | kJ |
| Energy wasted at brakes | 80.03 | kJ |
| Fuel Consumption change | 77% | |
| Fuel Economy Gain | 31% | |

The present invention can yield a consistent SOC irrespective of vehicle velocity. To demonstrate, acceleration from 0 to 50 mph and braking back to 0 will generate the same end SOC as acceleration from 0 to 30 and braking back to 0. Hence the consistency of SOC is achieved. The present invention can easily be implemented since vehicle velocity is known at all times by the VSC 46.

The above-described embodiment of the invention is provided purely for purposes of example. Many other variations, modifications, and applications of the invention may be made.

I claim:

1. A system to actively control a battery state of charge (SOC) for a vehicle comprising:

a vehicle velocity sensor;

a vehicle system controller (VSC) to receive output from the vehicle velocity sensor;

the VSC further comprising a first controller to actively vary a target battery SOC as a function of vehicle speed;

the VSC further comprising a second controller to set a maximum battery SOC limit using vehicle velocity; and the VSC further comprising a third controller to actively control a rate of charging the battery and determine the target battery SOC as a balance between a charge time and a charge current.

2. The system of claim 1 wherein the first controller uses a function of vehicle kinetic energy.

3. The system of claim 1 wherein the first controller uses a square of vehicle speed.

4. The system of claim 1 wherein the third controller further comprises a controller to change the target battery SOC based on a predetermined constant and a predetermined offset value.

5. The system of claim 1 wherein the third controller further comprises a controller to increase the target battery SOC as vehicle speed increases until the maximum battery SOC limit of the second controller is reached.

6. A method for actively controlling a battery state of charge (SOC) for a vehicle comprising the steps of:

sensing vehicle velocity;

receiving vehicle velocity in a vehicle system controller (VSC);

varying a target battery SOC as a function of vehicle speed;

setting a maximum battery SOC limit using vehicle velocity; and controlling a rate of charging the battery and determining the target battery SOC as a balance between a charge time and a charge current.

7. The method of claim 6 wherein the step of varying the target battery SOC as a function of vehicle speed uses a function of vehicle kinetic energy.

8. The method of claim 6 wherein the step of varying the target battery SOC as a function of vehicle speed uses a square of vehicle speed, for energy coming from an engine as a source.

9. The method of claim 6 wherein the step of controlling the rate of charging the battery and determining a target battery SOC further comprises the step of changing the target battery SOC based on a predetermined constant and a predetermined offset value.

10. The method of claim 6 wherein the step of controlling the rate of charging the battery and determining the target battery SOC further comprises the step of increasing the target battery SOC as vehicle speed increases until the maximum battery SOC limit is reached, for vehicle regenerative energy.

* * * * *